C. T. COATES.
UNICYCLE.
APPLICATION FILED AUG. 30, 1911.

1,046,267.

Patented Dec. 3, 1912.

2 SHEETS—SHEET 1.

Witnesses
H. C. Barry

Inventor
Clinton T. Coates
By Victor J. Evans
Attorney

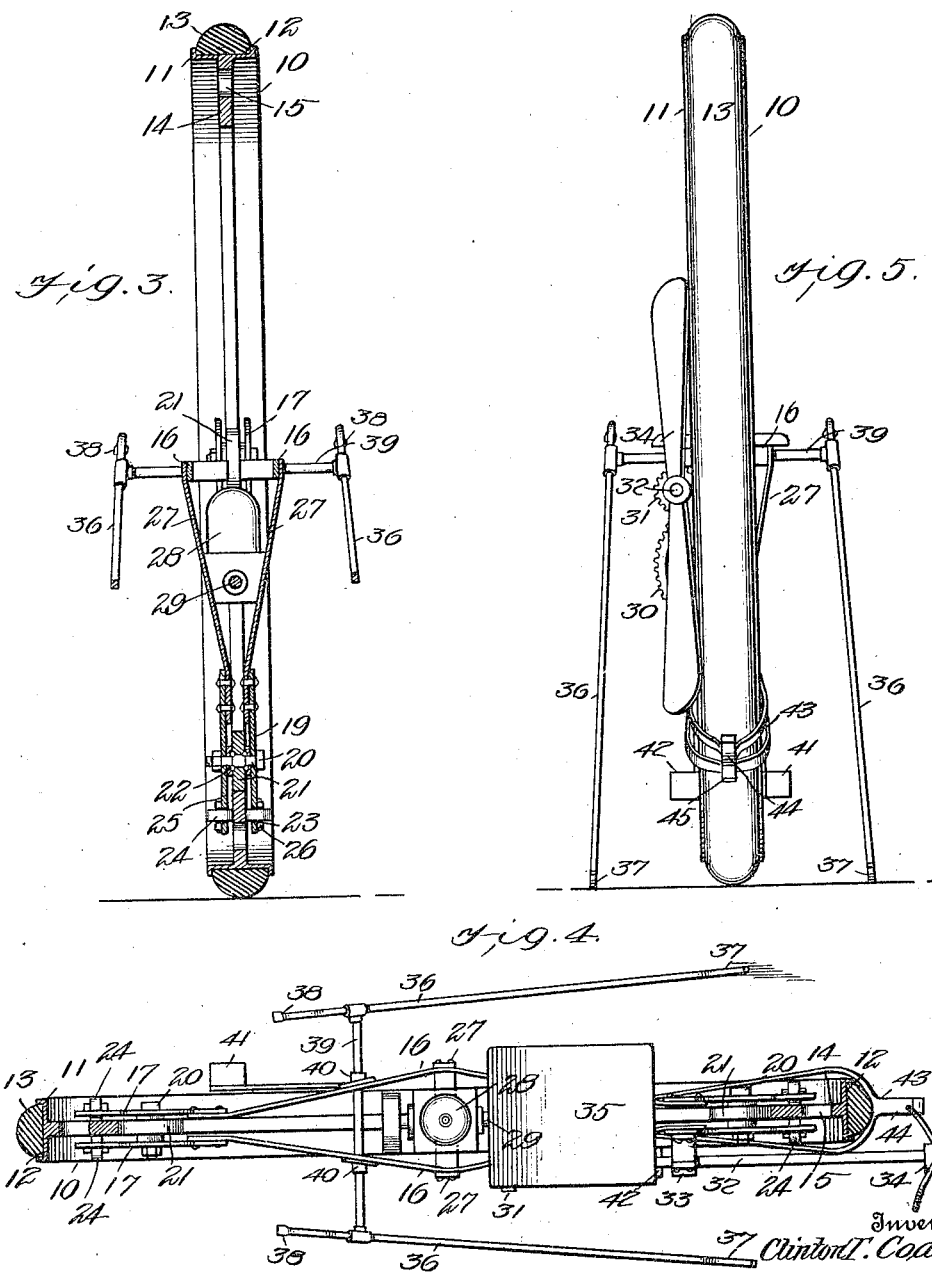

UNITED STATES PATENT OFFICE.

CLINTON T. COATES, OF ST. LOUIS, MISSOURI.

UNICYCLE.

1,046,267.  Specification of Letters Patent.  Patented Dec. 3, 1912.

Application filed August 30, 1911. Serial No. 646,807.

*To all whom it may concern:*

Be it known that I, CLINTON T. COATES, a citizen of the United States, residing at St. Louis city, State of Missouri, have invented new and useful Improvements in Unicycles, of which the following is a specification.

The invention relates to unicycles, and more particularly to the class of motor propelled unicycles.

The primary object of the invention is the provision of a unicycle of this character in which a rider may be comfortably seated when traveling from one point to another, and that is propelled through the medium of a motor, thereby requiring minimum physical energy on the part of the rider in controlling the machine.

Another object of the invention is the provision of a unicycle in which the single wheel thereof is driven by means of a motor, the wheel supporting a rider for transportation from one point to another, without requiring physical energy, said motor being designed to operate a propeller for advancing the wheel.

A further object of the invention is the provision of a unicycle which is simple in construction, strong, durable, easily ridden, and that may be manufactured at a mimimum expense.

With these and other objects in view, the invention consists in the construction, combination and arrangement of parts, as will be hereinafter more fully described, illustrated in the accompanying drawings, and pointed out in the claim hereunto appended.

Figure 2:
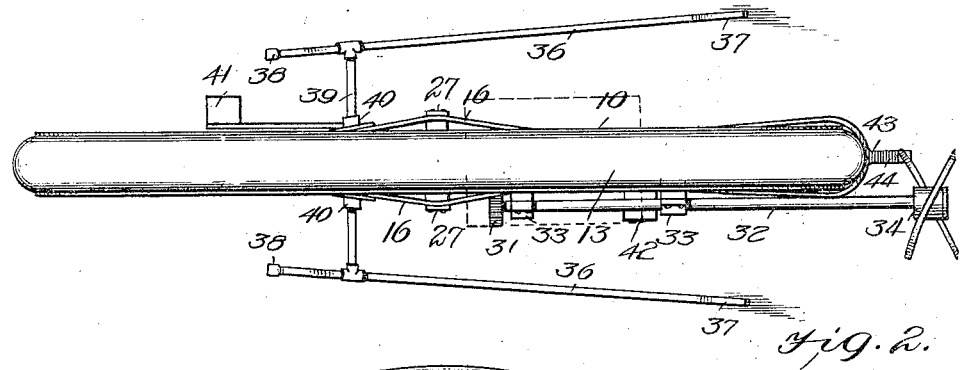
Figure 1:
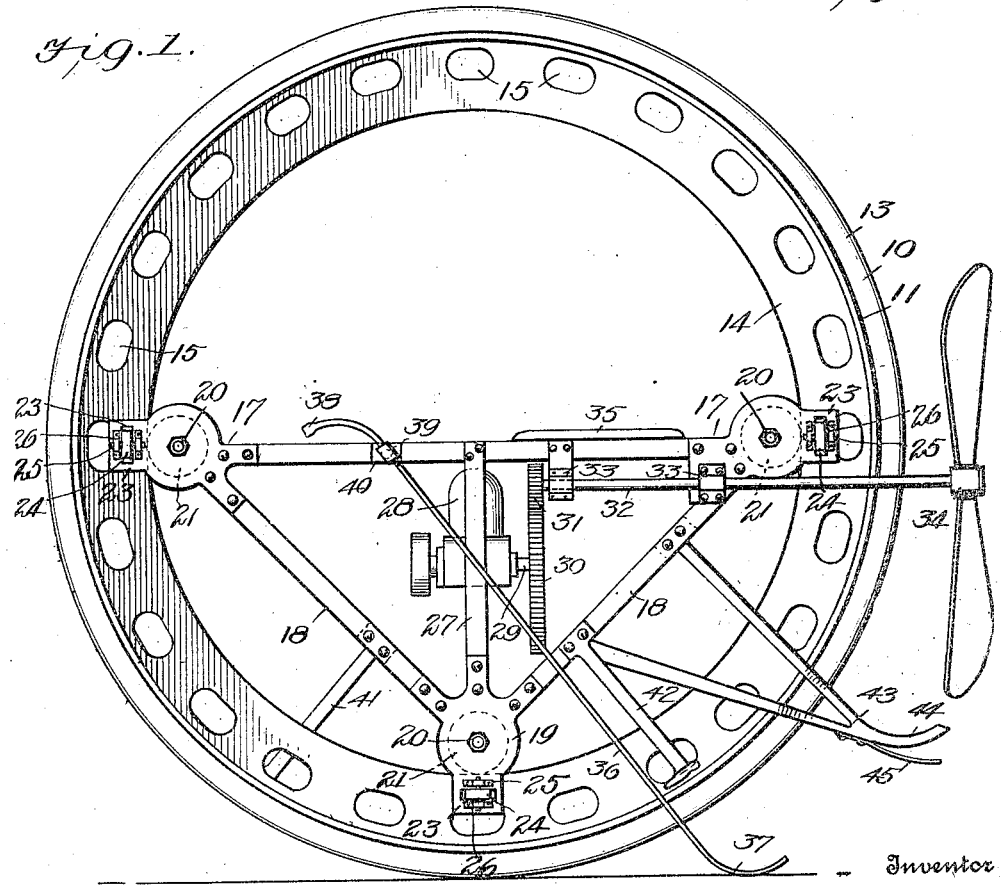

In the drawings: Figure 1 is a side elevation of a unicycle constructed in accordance with the invention. Fig. 2 is a top plan view thereof. Fig. 3 is a vertical transverse sectional view through the same. Fig. 4 is a horizontal transverse sectional view thereof. Fig. 5 is a rear elevation.

Similar reference characters indicate corresponding parts throughout the several views of the drawings.

Referring to the drawings by numerals, the unicycle comprises a single wheel 10, including a rim 11 formed with a tire receiving seat or channel 12, in which is disposed a cushioned or other resilient tire 13, which may be of any ordinary well-known construction, the rim 11 being formed on its inner side with a medial annular flange 14, the same being provided with a plurality of spaced openings 15 arranged intermediate its inner and outer edges, thereby minimizing the weight of the wheel without affecting the strength thereof.

Supported by the wheel 10 is a frame structure, comprising outwardly bulged side bars 16, the ends thereof being suitably united to the bearings 17, from which extend downwardly converging bars 18, the same being also connected to bearings 19. The bearings 17 and 19 overlap the said flange 14 for a distance at opposite sides thereof, for a purpose presently described.

Mounted in the bearings 17 and 19, respectively, are transverse journals 20, on which are rotatably mounted friction rollers 21, the latter being adapted to traverse the inner edge of the flange 14, when the wheel 10 is in motion. Surrounding the journals 20, at their ends engaged in the bearings 17 and 19, are the usual bearing balls 22, the latter being supported in the bearings in any suitable manner, and are employed for reducing friction, as usual.

In the bearings 17 and 19 are formed suitable elongated slots 23, through which project friction rollers 24, the same being mounted upon axles 25 suitably journaled in bearings 26 mounted upon the overlapped ends of the bearings 17 and 19, the rollers 24 being adapted to travel upon opposite faces of the flange 14 of the wheel 10 and prevent any lateral displacement of the frame structure, during the travel of the wheel.

Rising centrally from the bearings 19 are upwardly diverging uprights 27, the same being connected medially to the side bars 16 of the frame structure, and arranged between these uprights 27 is a motor 28 of any desired type, the drive shaft 29 being provided with a pinion 30 meshing with a pinion 31 fixed to the inner end of the propeller shaft 32 mounted in bearings 33, the outer end of the propeller shaft 32 being provided with a paddle or propeller wheel 34 disposed rearwardly of the wheel 10 which is designed to travel over the ground surface, the motor being controlled for the starting and stopping thereof in any suitable manner.

Fixed to the side bars 16, rearwardly of the plane of the motor, is a rider's seat 35 to be occupied by the rider or operator of the machine. Arranged at opposite sides of and exteriorly of the frame structure are rearwardly diverging skid arms 36, the lower ends of which are formed with curved ground engaging shoes 37, while the upper or opposite ends have mounted therein handle bars 38 disposed at the right hand and left hand side of the wheel to be grasped by the rider or operator of the machine, the skid arms 36 being pivotally connected by means of the cross rung 39 for independent movement with respect to each other, the said cross rung 39 being journaled transversely of the frame structure in suitable bearings 40 mounted upon the side bars 16 of the said frame structure. Thus it will be seen that upon exerting downward pressure upon either of the handle bars 38, the shoes 37 may be lifted from the ground, and upon pulling upwardly on either of the handle bars, the said shoes 37 will be brought into contact with the ground, and in this manner the wheel 10 may be properly guided in the desired course.

Secured to one of the bars 18 of the frame structure at one side thereof is a forwardly directed front foot rest 41, while secured to one of the bars 18 at the opposite side of the frame structure is a rearwardly directed foot rest 42, and in both of these foot rests are adapted to engage the feet of the rider when positioned or mounted upon the seat 35 on the frame structure.

Suitably fixed to the rearmost bars 18 is a rearwardly directed rest leg 43, the same being extended beyond the tread portion of the tire 13 and is formed with an upwardly curved foot 44, the latter carrying a resilient skid wing 45 which serves as a brake when contacting with the ground, and also prevents any possibility of the propeller wheel 34 striking the ground on the slight rocking of the frame structure in the wheel.

It is evident that when the rider is occupying the seat 35, he may slide forwardly or backwardly to balance himself, thereby throwing his weight upon either the forward foot rest 41 or the rear foot rest 42. The law of gravity will sustain the frame structure at the lower half of the wheel 10, during the momentum thereof. It is clearly evident that the machine may travel at a high rate of speed with the utilization of the least possible motive power, as the air resistance is reduced to a minimum.

The tire 13 carried by the rim 12 of the wheel 10 will absorb all shocks and jars incident to the travel of the wheel over the ground, so that the rider when occupying the seat 35 will not be subjected to any appreciable amount of jolting, during the advancement of the machine. It is of course understood that the diameter of the wheel 10 is of such size as to permit the operator or rider to occupy the seat 35 and to assume a comfortable sitting position within the wheel.

What is claimed is:

A unicycle comprising a wheel having an internal annular flange, a frame arranged within the wheel and having outwardly bowed side bars and also downwardly converging bars, terminal plates connecting the said side and converging bars and having circular portions, friction rollers journaled between the circular portions of the said plates and adapted to travel on the flange, a seat superimposed upon the outwardly bowed side bars at a point spaced from the center of the frame, a forwardly directed front foot rest fixed to the frame at one side thereof, a rearwardly directed rear foot rest fixed to the frame at the opposite side thereof, friction rollers journaled in the said plates spaced from and at right angles to the first named friction rollers for contact with opposite side faces of the flange, skid rods pivotally connected in the frame for independent movement and having ground engaging shoes at their lower ends, brake means projecting rearwardly from the said frame and having resilient wings at their free ends and motor operated propulsion means mounted on the frame.

In testimony whereof I affix my signature in presence of two witnesses.

CLINTON T. COATES.

Witnesses:
ALLEN BINKLEY,
EDITH BINKLEY.